(12) United States Patent
Sakata (10) Patent No.: US 8,048,944 B2
(45) Date of Patent: Nov. 1, 2011

(54) POLYAMIDE RESIN COMPOSITION (75) Inventor: Norio Sakata, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/602,701

(22) PCT Filed: Jun. 4, 2008

(86) PCT No.: PCT/JP2008/060276
§ 371 (c)(1),
(2), (4) Date: Dec. 2, 2009

(87) PCT Pub. No.: WO2008/149892
PCT Pub. Date: Dec. 11, 2008

(65) Prior Publication Data
US 2010/0179258 A1  Jul. 15, 2010

(30) Foreign Application Priority Data
Jun. 5, 2007  (JP) ................................. 2007-149532

(51) Int. Cl.
C08K 5/3492 (2006.01)
C08K 5/103 (2006.01)

(52) U.S. Cl. .................. 524/101; 524/308; 524/317

(58) Field of Classification Search .................. 524/101, 524/308, 317
See application file for complete search history.

(56) References Cited

U.S. PATENT DOCUMENTS

| | | | | |
|---|---|---|---|---|
| 6,291,633 B1 * | 9/2001 | Nakamura | .................... | 528/310 |
| 6,800,677 B2 * | 10/2004 | Yakabe et al. | ................. | 524/100 |
| 2002/0151625 A1 * | 10/2002 | Yakabe et al. | ................. | 524/127 |
| 2005/0234180 A1 * | 10/2005 | Ono et al. | .................... | 524/451 |
| 2008/0161490 A1 | 7/2008 | Endtner et al. | | |

FOREIGN PATENT DOCUMENTS

| | | |
|---|---|---|
| EP | 1 533 343 | 5/2005 |
| JP | 54-148050 | 11/1979 |
| JP | 61-238850 | 10/1986 |
| JP | 05-339417 | 12/1993 |
| JP | 08-157712 | 6/1996 |
| JP | 11-12460 | 1/1999 |
| JP | 11-302536 | 11/1999 |
| JP | 2003-292775 | 10/2003 |
| JP | 2004-292531 | 10/2004 |
| JP | 2005-171232 | 6/2005 |
| JP | 2008-512525 | 4/2008 |

OTHER PUBLICATIONS

International Search Report for PCT/JP2008/060276 mailed Jul. 15, 2008.
International Preliminary Report on Patentability for PCT/JP2008/060276 mailed Dec. 17, 2009.

* cited by examiner

*Primary Examiner* — Kriellion Sanders
(74) *Attorney, Agent, or Firm* — Greenblum & Bernstein, PLC (57) ABSTRACT

The present invention provides a polyamide resin composition comprising a polyamide resin (A), a melamine cyanurate-based flame retardant (B) and a surfactant (C), wherein the polyamide resin composition comprises 100 parts by mass of the total of 60 to 75% by mass of the polyamide resin (A) comprising at least one or more polyamide resin (A1) having a melting point of 255 to 270° C. and 25 to 40% by mass of the melamine cyanurate-based flame retardant (B), and 0.1 to 1.0 part by mass of the surfactant (C) comprising at least one or more fatty acid ester of a polyalkylene polyhydric alcohol, and wherein the melamine cyanurate-based flame retardant (B) dispersed in the polyamide resin composition has an average dispersion particle diameter of 1 to 20 μm.

16 Claims, 1 Drawing Sheet

POLYAMIDE RESIN COMPOSITION

TECHNICAL FIELD

The present invention relates to a polyamide resin composition having high flame retardancy, and a method for manufacturing the polyamide resin composition.

BACKGROUND ART

Polyamide resins are used in various fields such as automobile parts and electric parts and electronic parts by utilizing superiorities in mechanical characteristics, electric characteristics, chemical resistance, molding processability, resistance to soldering heat and the like. Above all, polyamide resin compositions comprising a melamine cyanurate-based flame retardant as a flame retardant having no halogen are broadly used in the fields requiring flame retardancy and resistance to soldering heat as in electric parts and electronic parts such as connectors.

In recent years, connector applications have demanded materials meeting the fire hazard testing according to the IEC 60695-2-11 standard and the IEC 60695-2-13 standard, which require higher flame retardancy levels. However, the present situation is such that polyamide resins used in connector applications do not satisfy these requirements.

Patent Document 1 discloses that a flame retardant polyamide resin molding material obtained by mixing a flame retardant polyamide resin composition pellets containing melamine cyanurate with a polyamide resin pellets in order to improve the toughness of molded articles after molding suppresses the occurrence of silver streaks and improves the appearance.

Patent Document 2 discloses that a flame retardant polyamide resin composition containing a polyamide resin, a triazine-based flame retardant and a carboxylic acid amide-based wax improves the glow wire ignition temperature. Patent Document 3 discloses a composition for molding containing a non-branched thermoplastic polyamide, melamine cyanurate, a flame retardant containing nitrogen other than melamine cyanurate, and a phosphate-based flame retardant.

Further, Patent Document 4 discloses that a flame retardant polyamide resin composition obtained by melt-kneading a masterbatch obtained by melt-kneading a polyamide resin and melamine cyanurate, with a polyamide resin, is excellent in mechanical characteristics such as elongation at tensile break.

Still further, Patent Document 5 discloses a technology for treating the surface of fine melamine cyanurate with a specific additive to suppress reaggregation.
Patent Document 1: Japanese Patent Laid-Open No. H11-302536
Patent Document 2: Japanese Patent Laid-Open No. 2005-171232
Patent Document 3: National Publication of International Patent Application No. 2008-512525

DISCLOSURE OF THE INVENTION

Problems to be Solved by the Invention

However, the polyamide resin compositions disclosed in Patent Documents 1 to 4 are still not sufficient in flame retardancy, and required to be further improved.

According to studies by the present inventor, the technology disclosed in Patent Document 5 does not have an enough effect to suppress reaggregation, and cannot provide a target flame retardancy even if a flame retardant is added in a predetermined amount.

The problem to be solved by the present invention is to provide a polyamide resin composition having a high flame retardancy.

Means for Solving the Problems

As a result of exhaustive studies to solve the above-mentioned problem, the present inventor has found that a polyamide resin composition obtained by blending a polyamide resin, a specific melamine cyanurate-based flame retardant and a specific surfactant in a specific formulation proportion wherein the melamine cyanurate-based flame retardant dispersed in the composition has a specific average dispersion particle diameter can solve the above-mentioned problem. This finding has led to the completion of the present invention.

That is, the present invention includes the following:
(1) A polyamide resin composition comprising a polyamide resin (A), a melamine cyanurate-based flame retardant (B) and a surfactant (C),
    wherein the polyamide resin composition comprises 100 parts by mass of the total of 60 to 75% by mass of the polyamide resin (A) comprising at least one or more polyamide resin (A1) having a melting point of 255 to 270° C. and 25 to 40% by mass of the melamine cyanurate-based flame retardant (B), and 0.1 to 1.0 part by mass of the surfactant (C) comprising at least one or more fatty acid ester of a polyalkylene polyhydric alcohol, and
    wherein the melamine cyanurate-based flame retardant (B) dispersed in the polyamide resin composition has an average dispersion particle diameter of 1 to 20 μm.
(2) The polyamide resin composition according to (1), wherein the polyamide resin (A) further comprises a polyamide resin (A2) having a melting point of 180 to 250° C.
(3) The polyamide resin composition according to (2), wherein the polyamide resin (A) comprises 40 to 80% by mass of the polyamide resin (A1) and 20 to 60% by mass of the polyamide resin (A2).
(4) The polyamide resin composition according to any one of (1) to (3), wherein the polyamide resin (A1) is a polyamide 66.
(5) The polyamide resin composition according to any one of (2) to (4), wherein the polyamide resin (A2) is one or more polyamides selected from polyamides 6 and polyamide copolymers comprising one or more monomer units of polyamide 6, polyamide 610, polyamide 612 or polyamide 6I and a monomer unit of polyamide 66.
(6) The polyamide resin composition according to any one of (1) to (5), wherein the melamine cyanurate-based flame retardant (B) has an average dispersion particle diameter of 5 to 15 μm.
(7) The polyamide resin composition according to any one of (1) to (6), wherein the melamine cyanurate-based flame retardant (B) is melamine cyanurate.
(8) The polyamide resin composition according to any one of (1) to (7), wherein the surfactant (C) is at least one selected from the group consisting of polyoxyethylene monolaurate, polyoxyethylene monostearate, polyoxyethylene distearate, polyoxyethylene monooleate, polyoxyethylene sorbitan monolaurate, polyoxyethylene sorbitan monostearate, polyoxyethylene sorbitan tristearate, polyoxyethylene sorbitan monooleate, and polyoxyethylene sorbitan trioleate.

(9) A method for manufacturing a polyamide resin composition comprising a polyamide resin (A), a melamine cyanurate-based flame retardant (B) and a surfactant (C), comprising the step of feeding all the components into a twin-screw extruder through a first feed opening thereof using at least one raw material feed apparatus to melt-knead the components, wherein the polyamide resin composition comprises 100 parts by mass of the total of 60 to 75% by mass of the polyamide resin (A) comprising at least one or more polyamide resin (A1) having a melting point of 255 to 270° C. and 25 to 40% by mass of the melamine cyanurate-based flame retardant (B), and 0.1 to 1.0 part by mass of the surfactant (C) comprising at least one fatty acid ester of a polyalkylene polyhydric alcohol, and wherein the melamine cyanurate-based flame retardant (B) dispersed in the polyamide resin composition has an average dispersion particle diameter of 0.1 to 20 μm.

(10) The method for manufacturing a polyamide resin composition according to (9), wherein the feeding comprises feeding a blend comprising the total amount of the polyamide resin (A), the total amount of the surfactant (C) and 10 to 50% by mass of the melamine cyanurate-based flame retardant (B) into a twin-screw extruder through a first feed opening thereof using at least one raw material feed apparatus, and feeding 50 to 90% by mass of the melamine cyanurate-based flame retardant (B) into the twin-screw extruder through the first feed opening thereof using at least one raw material-feed apparatus different from the former raw material feed apparatus.

(11) The method for manufacturing a polyamide resin composition according to (9) or (10), wherein the melamine cyanurate-based flame retardant (B) has a median particle diameter of 1 to 25 μm.

(12) The method for manufacturing a polyamide resin composition according to any one of (9) to (11), wherein the polyamide resin (A) comprises 40 to 70% by mass of a polyamide resin (A1) having a melting point of 255 to 270° C. and 30 to 60% by mass of a polyamide resin (A2) having a melting point of 180 to 250° C.

(13) The method for manufacturing a polyamide resin composition according to any one of (9) to (12), wherein the polyamide resin (A1) is a polyamide 66; and the polyamide resin (A2) is one or more polyamides selected from polyamides 6 and polyamide copolymers comprising one or more monomer units of polyamide 6, polyamide 610, polyamide 612 or polyamide 6I and a monomer unit of polyamide 66.

(14) The method for manufacturing a polyamide resin composition according to any one of (9) to (13), wherein the melamine cyanurate-based flame retardant (B) is melamine cyanurate.

(15) The method for manufacturing a polyamide resin composition according to any one of (9) to (14), wherein the surfactant (C) is at least one selected from the group consisting of polyoxyethylene monolaurate, polyoxyethylene monostearate, polyoxyethylene distearate, polyoxyethylene monooleate, polyoxyethylene sorbitan monolaurate, polyoxyethylene sorbitan monostearate, polyoxyethylene sorbitan tristearate, polyoxyethylene sorbitan monooleate, and polyoxyethylene sorbitan trioleate.

ADVANTAGES OF THE INVENTION

The present invention can provide a polyamide resin composition having high flame retardancy.

Specifically, the present invention can provide a polyamide resin composition having excellent flame retardancy with 800° C. or higher of a glow wire ignition temperature using a test specimen 3 mm in thickness according to the IEC 60695-2-13 standard, and a method for manufacturing the polyamide resin composition.

BRIEF DESCRIPTION OF THE DRAWINGS

FIG. 2A shows a plan view from above the connector-like molded article 8. FIG. 2B shows a front view of the short face of the connector-like molded article 8.

FIG. 2C shows a side view of the long face of the connector-like molded article 8. The upper part thereof is a funnel part 9 having 9 openings 12 partitioned by walls 11, and the lower part thereof is a cavity part 10 surrounded by a frame 13.

DESCRIPTION OF SYMBOLS

1 TWIN-SCREW EXTRUDER
2 FIRST FEED OPENING
3 SECOND FEED OPENING
4 VACUUM VENT PORT
5 SCREW
6 SCREW WORKING LENGTH
7 RESIN FLOWING DIRECTION
8 CONNECTOR-like MOLDED ARTICLE
9 FUNNEL PART
10 CAVITY PART
11 WALL
12 OPENING
13 FRAME

BEST MODE FOR CARRYING OUT THE INVENTION

Hereinafter, the best mode for carrying out the present invention (hereinafter, referred to as the embodiment) will be described in detail. Here, the scope of the present invention is not limited to the embodiment described hereinafter, and various changes and modifications may be made within the gist of the present invention.

The polyamide resin composition according to the embodiment is a polyamide resin composition comprising a polyamide resin (A), a melamine cyanurate-based flame retardant (B) and a surfactant (C), wherein the polyamide resin composition comprises 100 parts by mass of the total of 60 to 75% by mass of the polyamide resin (A) comprising at least one or more polyamide resin (A1) having a melting point of 255 to 270° C. and 25 to 40% by mass of the melamine cyanurate-based flame retardant (B), and 0.1 to 1.0 part by mass of the surfactant (C) comprising at least one or more fatty acid ester of a polyalkylene polyhydric alcohol, and wherein the melamine cyanurate-based flame retardant (B) dispersed in the polyamide resin composition has an average dispersion particle diameter of 1 to 20

[Polyamide Resin (A)]

The polyamide resin (A) used in the embodiment is a polyamide resin comprising at least one or more polyamide resin (A1) having a melting point of 255° C. or higher and 270° C. or lower from the viewpoint of the resistance to soldering heat of the polyamide resin composition.

In the embodiment, the polyamide resins are polymers having amide bonds (—NHCO—) in their main chains, and examples thereof include polycaprolactam (polyamide 6), polytetramethylene adipamide (polyamide 46), polyhexamethylene adipamide (polyamide 66), polyhexamethylene cyclohexylamide (polyamide 6C), polyhexamethylene sebacamide (polyamide 610), polyhexamethylene dodecamide (polyamide 612), polyundecalactam (polyamide 11), polydodecalactam (polyamide 12), polyhexamethylene isophthalamide (polyamide 6I), polyhexamethylene terephthalamide (polyamide 6T), polynonamethylene terephthalamide (polyamide 9T), polydodecamethylene terephthalamide (polyamide 12T) and polymetaxylylene adipamide (polyamide MXD6), and polyamide copolymers comprising at least two different polyamide forming components among these, and mixtures thereof.

In the embodiment, the melting point can be determined by the differential scanning calorimetry (DSC) measurement. Specifically, a sample is measured using a differential calorimetric analyzer under the rising-temperature condition of 20° C./min from room temperature to observe an endothermic peak temperature (Tm1); thereafter, the sample is held for 3 min at a temperature 20 to 50° C. higher than Tm1. Then, the sample is cooled to room temperature under the descending-temperature condition of 20° C./min; thereafter, the sample is measured again under the rising-temperature condition of 20° C./min to observe an endothermic peak, and the temperature giving the peak top is defined as a melting point.

In the embodiment, the polyamide resin (A) is a polyamide resin comprising at least one or more polyamide resin (A1) having a melting point of 255° C. or higher and 270° C. or lower. The polyamide resin (A) preferably further comprises a polyamide resin (A2) having a melting point of 180° C. or higher and 250° C. or lower from the viewpoint of processability.

In the embodiment, the polyamide resin (A1) is preferably a polyamide 66 from the viewpoint of the resistance to soldering heat of the polyamide resin composition, and the polyamide resin (A2) is preferably one or more polyamides selected from polyamides 6 and polyamide copolymers comprising one or more monomer units of polyamide 6, polyamide 610, polyamide 612 and polyamide 6I and a monomer unit of polyamide 66 from the viewpoint of the fluidity at molding and the improvement in the toughness.

As the polyamide resin (A2), polyamides 6 and polyamide copolymers may be used singly or as a mixture of two or more.

The polyamide resin (A2) is more preferably a polyamide 6, or a polyamide copolymer (PA66/6) comprising a polyamide 6 monomer unit and a polyamide 66 monomer unit. The molar ratio of the polyamide 66 monomer unit and the polyamide 6 monomer unit constituting a preferable polyamide resin (A2) is preferably 60 mol % or more and 95 mol % or less of the polyamide 66 monomer unit and 0.5 mol % or more and 40 mol % or less of the polyamide 6 monomer unit, and the more preferable range is 80 mol % or more and 95 mol % or less of the polyamide 66 monomer unit and 5 mol % or more and 20 mol % or less of the polyamide 6 monomer unit, from the viewpoint of an excellent balance of the fluidity and resistance to soldering heat.

The preferable formulation proportion of a polyamide resin (A1) and a polyamide resin (A2) is 40% by mass or more and 80% by mass or less of the polyamide resin (A1) and 20% by mass or more and 60% by mass or less of the polyamide resin (A2), and the more preferable range thereof is 50% by mass or more and 70% by mass or less of the polyamide resin (A1) and 30% by mass or more and 50% by mass or less of the polyamide resin (A2), in case that the total of the polyamide is taken as 100% by mass, from the viewpoint of an excellent balance of the resistance to soldering heat, the fluidity at molding and the toughness.

[Melamine Cyanurate-Based Flame Retardant (B)]

The melamine cyanurate-based flame retardant (B) used in the embodiment is a reaction product of melamine or its derivative with cyanuric acid or its derivative.

A melamine cyanurate-based flame retardant can be manufactured by the following method.

For example, melamine or its derivative is added to an aqueous solution of cyanuric acid or its derivative, and stirred at approximately 90 to 100° C. A precipitate obtained as the reaction product is filtered and dried, and then pulverized into a micropowder to manufacture a melamine cyanurate-based flame retardant.

In the embodiment, the melamine cyanurate-based flame retardant (B) preferably has a median particle diameter (D50) of 1 μm or more and 25 μm or less from the viewpoint of the dispersibility of the melamine cyanurate-based flame retardant (B). The median particle diameter of 1 μm or more of the melamine cyanurate-based flame retardant (B) can make the handling easy and suppress the degradation of aggregability of the melamine cyanurate-based flame retardant (B). The median particle diameter of 25 μm or less of the melamine cyanurate-based flame retardant (B) exhibits an excellent balance between the dispersibility in the polyamide resin composition and the handleability.

In the embodiment, the median particle diameter (D50) refers to a particle diameter at which the mass of particles whose diameter is larger than the particle diameter accounts for 50% of the mass of a whole particles in a particle diameter distribution of the particles, as defined in JIS 28901.

The measurement of the median particle diameter (D50) is not specifically limited, but can be carried out, for example, by the laser diffraction scattering method. Specifically, particle diameters are taken on the abscissa and frequencies (masses) are taken on the ordinate to make plots by the laser diffraction scattering method, and a median particle diameter (D50) can be measured as a particle diameter at which the accumulated mass becomes 50% when total of the accumulated mass of the frequencies is taken as 100%.

In the embodiment, example of the melamine cyanurate-based flame retardant (B) preferably includes melamine cyanurate, which is an equimolar reaction product of melamine and cyanuric acid. The melamine cyanurate may contain 0.001% by mass or more and 0.30% by mass or less of unreacted melamine and cyanuric acid. Such a melamine cyanurate is commercially available, and an industrially available one can suitably be used.

In the embodiment, the melamine cyanurate-based flame retardant (B) dispersed in a polyamide resin composition needs to have an average dispersion particle diameter of 1 μm or more and 20 μm or less from the viewpoint of the improvement in the fire resistance of the polyamide resin composition. The average dispersion particle diameter is preferably 1 μm or more and 15 μm or less from the viewpoint of tensile characteristics, and more preferably 5 μm or more and 10 μm or less.

The measurement of the average dispersion particle diameter of a melamine cyanurate-based flame retardant (B) in a polyamide resin composition is not specifically limited, but can be carried out, for example, by the following method.

A thin piece 5 μm in thickness is fabricated from a molded article obtained by molding the polyamide resin composition according to the embodiment. The thin piece is observed by an optical microscope; and circle-corresponding diameters of particles of the melamine cyanurate-based flame retardant viewed in the image are determined using image analysis and the average thereof is taken as an average dispersion particle diameter.

[Surfactant (C)]

The surfactant (C) used in the embodiment is a surfactant comprising at least one or more fatty acid ester of a polyalkylene polyhydric alcohol.

Examples of fatty acid esters of polyalkylene polyhydric alcohols include ester derivatives of polyalkylene polyhydric alcohols such as polyethylene glycol, polypropylene glycol and polybutylene glycol, and aliphatic carboxylic acids such as capric acid, lauric acid, myristic acid, palmitic acid, stearic acid, behenic acid, cerotic acid, montanic acid, melissic acid, oleic acid and erucic acid, and are industrially easily available. In the embodiment, from the viewpoint of the dispersibility of the melamine cyanurate-based flame retardant (B), polyoxyethylene monolaurate, polyoxyethylene monostearate, polyoxyethylene distearate, polyoxyethylene monooleate, polyoxyethylene sorbitan monolaurate, polyoxyethylene sorbitan monostearate, polyoxyethylene sorbitan tristearate, polyoxyethylene sorbitan monooleate, polyoxyethylene sorbitan trioleate, and the like are suitably used, and polyoxyethylene monolaurate, polyoxyethylene monostearate and polyoxyethylene monooleate are specifically preferably used.

[Polyamide Resin Composition]

The polyamide resin composition according to the embodiment is a polyamide resin composition comprising the polyamide resin (A), the melamine cyanurate-based flame retardant (B) and the surfactant (C), wherein the polyamide resin composition comprises 100 parts by mass of the total of 60 to 75% by mass of the polyamide resin (A) and 25 to 40% by mass of the melamine cyanurate-based flame retardant (B), and 0.1 to 1.0 part by mass of the surfactant (C), wherein the melamine cyanurate-based flame retardant (B) dispersed in the polyamide resin composition has an average dispersion particle diameter of 1 to 20 μm.

The content of the melamine cyanurate-based flame retardant (B) in the polyamide resin composition, from the viewpoint of the flame retardancy and tensile characteristics, is 25% by mass or more and 40% by mass or less, preferably 30% by mass or more and 40% by mass or less, and more preferably 35% by mass or more and 40% by mass or less based on 100% by mass of the total of the polyamide resin (A) and the melamine cyanurate-based flame retardant (B).

The content of the surfactant (C) in the polyamide resin composition, from the viewpoint of a balance of the dispersibility of the melamine cyanurate-based flame retardant and the flame retardancy, is 0.1 part by mass or more and 1.0 part by mass or less, preferably 0.1 part by mass or more and 0.75 part by mass or less, and more preferably 0.1 part by mass or more and 0.6 part by mass or less based on 100 parts by mass of the total of the polyamide resin (A) and the melamine cyanurate-based flame retardant (B).

Specifically, making the content of the surfactant (C) 1.0 part by mass or less exhibits an effect of scraping (self-cleaning effect) the melamine cyanurate-based flame retardant (B) and the surfactant (C) adhered on a blender inner wall due to rolling of polyamide resin (A) pellets on the blender inner wall at blending by a cone blender, so proper amounts of the melamine cyanurate-based flame retardant (B) and the surfactant (C) can be spread on the polyamide resin (A) surface. This effect can provide a polyamide resin composition excellent in the dispersibility of the melamine cyanurate-based flame retardant (B).

To the polyamide resin composition according to the embodiment, various types of additives commonly used can be added in the range of not impairing the purpose of the embodiment, as required. Examples thereof include fillers, for example, inorganic fibers such as glass fiber and carbon fiber, inorganic fillers such as mica, talc, clay mineral, alumina, silica and apatite, flame retardants such as aluminum hydroxide, magnesium hydroxide, zinc borate, zinc stannate, zinc hydroxystannate, ammonium polyphosphate, melamine cyanurate, succinoguanamine, melamine polyphosphate, melamine sulfate, melamine phthalate and aluminum phosphate, pigments and colorants such as titanium white and carbon black, thermal stabilizers represented by metal phosphite such as sodium hypophosphite, and hindered phenols and hindered amines, lubricants such as higher fatty acid metal salts, higher fatty acid amides and higher fatty acid esters, various types of plasticizers, and antistatic agents.

The polyamide resin composition according to the embodiment preferably has a tensile elongation (%) of 1.7 or more and 4.0 or less. The tensile elongation (%) is more preferably 1.9 or more and 3.8 or less, and furthermore preferably 2.0 or more and 3.5 or less.

Making the tensile elongation the range described above can provide a polyamide resin composition excellent in the cracking resistance to pin press-fit into connectors.

The polyamide resin composition according to the embodiment preferably has a glow wire ignition temperature (° C.) of 800° C. or higher.

Making the glow wire ignition temperature 800° C. or higher can provide a polyamide resin composition excellent in the flame retardancy.

(Manufacturing Method of a Polyamide Resin Composition)

The method for manufacturing the polyamide resin composition according to the embodiment is a method for manufacturing a polyamide resin composition comprising a polyamide resin (A), a melamine cyanurate-based flame retardant (B) and a surfactant (C), comprising the step of feeding all components into a twin-screw extruder through a first feed opening thereof using at least one raw material feed apparatus to melt-knead the components, wherein the polyamide resin composition comprises 100 parts by mass of the total of 60 to 75% by mass of the polyamide resin (A) comprising at least one polyamide resin (A1) having a melting point of 255 to 270° C. and 25 to 40% by mass of the melamine cyanurate-based flame retardant (B), and 0.1 to 1.0 part by mass of the surfactant (C) comprising at least one or more fatty acid ester of a polyalkylene polyhydric alcohol, and wherein the melamine cyanurate-based flame retardant (B) dispersed in the polyamide resin composition has an average dispersion particle diameter of 1 to 20 μm.

The method for manufacturing a polyamide resin composition according to the embodiment is not specifically limited as long as it is a method in which for blending a polyamide resin (A), a melamine cyanurate-based flame retardant (B) and a surfactant (C), these are fed into a twin-screw extruder through a first feed opening thereof using at least one raw material feed apparatus to be melt-kneaded. The polyamide resin (A), the melamine cyanurate-based flame retardant (B) and the surfactant (C) are preferably each fed into a twin-screw extruder through a first feed opening thereof using at least one different raw material feed apparatus from the viewpoint of the dispersibility of the melamine cyanurate-based flame retardant (B). In the embodiment, a polyamide resin (A1), a polyamide resin (A2), a melamine cyanurate-based flame retardant (B) and a surfactant (C) are more preferably each fed into a twin-screw extruder through a first feed opening thereof using at least one different raw material feed apparatus.

In the method for manufacturing a polyamide resin composition according to the embodiment, 100 parts by mass of the total of 60% by mass or more and 75% by mass or less of a polyamide resin (A) and 25% by mass or more and 40% by mass or less of a melamine cyanurate-based flame retardant (B), and 0.1 part by mass or more and 1.0 part by mass or less of a surfactant (C) are fed into a twin-screw extruder through a first feed opening thereof using at least one raw material feed apparatus, and melt-kneaded.

In the embodiment, specific examples of the twin-screw extruder include ZSK series made by Coperion Corp., TEM series made by Toshiba Machine Co., Ltd., and TEX series made by Japan Steel Works, Ltd.

Figure 1:
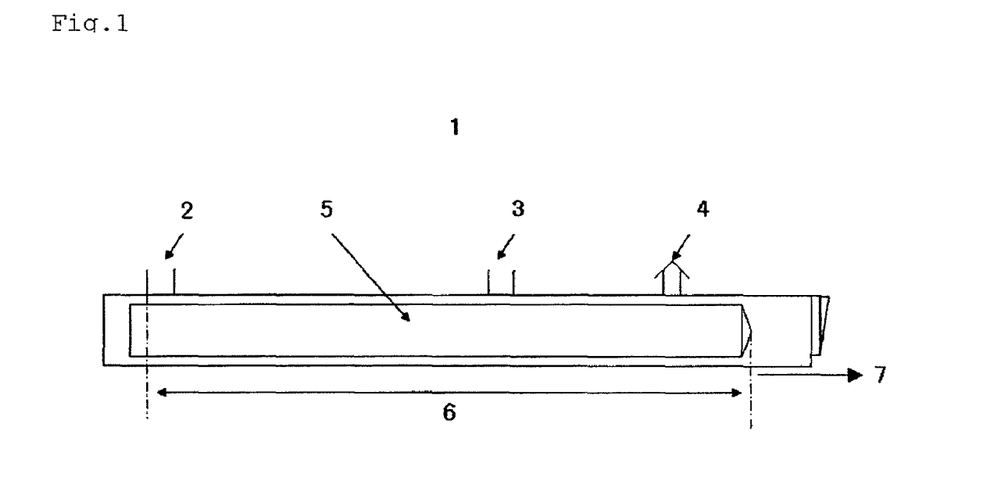
FIG. 1 shows a schematic diagram of a twin-screw extruder 1 as an example of manufacturing apparatuses used in the embodiment.

FIG. 1 shows a schematic diagram of a twin-screw extruder 1 as an example of manufacturing apparatuses used in the embodiment.

As exemplified in FIG. 1, a twin-screw extruder 1 used in the embodiment has a structure having a screw 5, a first feed opening 2 installed on the upstream side relative to the flowing direction of raw materials, a second feed opening 3 installed downstream thereof, and a vacuum vent port 4 as a devolatilizing section installed downstream thereof.

The twin-screw extruder used in the embodiment preferably has an L/D of the twin-screw extruder (screw working length/screw outer diameter) in the range of 20 or more and 60 or less, and more preferably 30 or more and 50 or less.

The screw working length 6 in the embodiment is a length from the upstream end relative to the flowing direction of raw materials of the first feed opening 2 of the twin-screw extruder 1 to the front end of the screw 5 in the resin flowing direction 7 out of the length of the screw 5.

The screw outer diameter in the embodiment refers to a rotating diameter (screw diameter).

The rotating diameter (screw diameter) refers to a maximum circle diameter of a cross section of a rotating screw taken perpendicular to the longitudinal direction of the screw working length.

In the embodiment, the temperature in melt-kneading, from the viewpoint of the productivity and the suppression of thermal degradation, is preferably a temperature of 5 to 60° C. higher than the melting point of a polyamide resin (A), more preferably a temperature of 5 to 50° C. higher than that, and furthermore preferably a temperature of 5 to 30° C. higher than that.

The raw material feed apparatus to feed raw materials into a twin-screw extruder is not especially limited, but a single-screw feeder, a twin-screw feeder, a table feeder, a rotary feeder, a liquid feed pump and the like are usable. Above all, a loss-in-weight feeder is preferable because the fluctuation error in feeding of raw materials is small. Methods for adding a polyamide resin, a melamine cyanurate-based flame retardant and a surfactant are not specifically limited, but usable are methods in common use including a method in which each component is fed from a different raw material feed apparatus, and a method in which all components or optional two components are mixed by a mixer, a cone blender or the like and then added by a raw material feed apparatus.

In the embodiment, from the viewpoint of the productivity and the flame retardancy, a method is suitably used in which the total amount of a polyamide resin (A), the total amount of a surfactant and 10% by mass or more and 50% by mass or less of a melamine cyanurate-based flame retardant (B) are fed into a twin-screw extruder through a first feed opening thereof using at least one raw material feed apparatus, and then, 50% by mass or more and 90% by mass or less of the melamine cyanurate-based flame retardant (B) is fed into the twin-screw extruder through the first feed opening thereof using at least one raw material feed apparatus different from the former raw material feed apparatus to feed the blend.

In the embodiment, a blend in which a melamine cyanurate-based flame retardant (B) is spread on the polyamide resin (A) surface after a surfactant (C) is spread thereon is fed into a twin-screw extruder through a first feed opening thereof using at least one raw material feed apparatus, and as required, the melamine cyanurate-based flame retardant (B) is fed into the twin-screw extruder through the first feed opening thereof using at least one raw material feed apparatus different from the former raw material feed apparatus to feed the blend, which is preferable because a polyamide resin composition comprising the melamine cyanurate-based flame retardant (B) excellent in dispersibility can be provided.

In the embodiment, the melamine cyanurate-based flame retardant (B) used for manufacturing a polyamide resin composition preferably has a median particle diameter (D50) of 1 μm or more and 25 μm or less from the viewpoint of the dispersibility of the melamine cyanurate-based flame retardant (B) in the polyamide resin composition.

EXAMPLES

Hereinafter, the embodiment will be described further in detail by way of Examples, but is not limited to the following Examples unless it departs from the gist. Evaluations of physical properties described in the following Examples and Comparative Examples were carried out as follows.

(1) Melting Point

A differential calorimetric analyzer DSC-7 made by Perkin Elmer Inc. was used. The temperature-rising and temperature-descending conditions were each 20° C./min. Approximately 10 mg of a sample was heated from room temperature to observe an endothermic peak temperature (Tm1), and then held at a temperature 20 to 50° C. higher than Tm1 for 3 min. The sample was then cooled to room temperature, and then again heated to observe an endothermic peak. The temperature the peak top indicated was defined as the melting point.

(2) Median Particle Diameter

A laser diffraction particle size distribution analyzer SALD-7000 made by Shimadzu Corp. was used. A sample was dispersed in pure water to make a measurement sample, and was measured using a flow cell. Particle diameters were taken on the abscissa and respective frequencies (masses) were taken on the ordinate to make plots, and a particle diameter at which the accumulated mass became 50% when the accumulated mass total of the frequencies was taken as 100% was defined as the median particle diameter (D50).

(3) Average Dispersion Particle Diameter

A molded piece of 128 mm×18 mm×3 mm was obtained using an injection molding machine (PS40E made by Nissei Plastic Industrial Co., Ltd.) at a cylinder temperature of 270° C. and a mold temperature of 80° C. under the injection molding condition of injection of 12 sec and cooling of 18 sec. Thin pieces of 18 mm×3 mm×5 were fabricated from the molded piece using a microtome (RM2165 made by Leica Microsystems Inc.). Circle-corresponding diameters of 500 or more of melamine cyanurate-based flame retardant particles in the thin pieces were measured using an image analyzer (microscope section: Nikon E600L, camera section: Sony XC-003, image processing soft: Nireco LUZEX SE) by the reflection method. The average value was defined as the average dispersion particle diameter.

(4) Tensile Elongation

An ASTM No. 1 test piece 3 mm in thickness was obtained using an injection molding machine (PS40E made by Nissei Plastic Industrial Co., Ltd.) at a cylinder temperature of 270° C. and a mold temperature of 80° C. under the injection molding condition of injection of 12 sec and cooling of 18 sec. The tensile elongation was measured according to ASTM D638.

(5) Glow Wire Ignition Temperature

A test piece of 90 mm×60 mm×3.0 mm was obtained using an injection molding machine (FN3000 made by Nissei Plastic Industrial Co., Ltd.) at a cylinder temperature of 270° C. and a mold temperature of 80° C. under the injection molding condition of injection of 12 sec and cooling of 12 sec. The glow wire ignition temperature of the test piece was measured according to the IEC 60695-2-13 standard (year 2000 edition). The glow wire ignition temperature equal to or greater than 825° C. was recorded as 825° C.; that of 775° C., as 775° C.; and that of 800° C., as 800° C.

(6) Glow Wire Flammability Test

Figure 2:
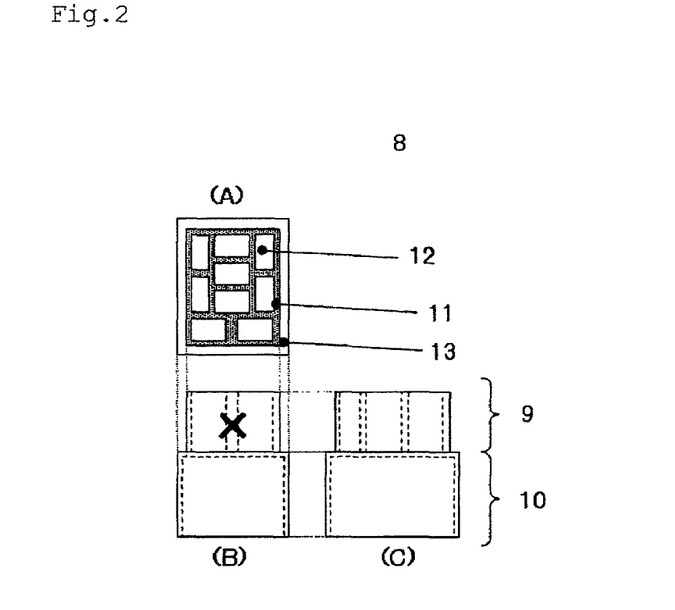
FIG. 2 shows a connector-like molded article 8 used in a flame retardancy test in the embodiment.

A connector-like molded article 8 (approximately 2.5 cm×approximately 3 cm×approximately 3.5 cm) having thin wall portions and a complex shape as shown in FIG. 2 was molded. The connector-like molded article 8 was tested according to IEC 60695-2-11 standard (year 2000 edition). The wire temperature at testing was set at 750° C. and the wire was pressed perpendicularly on a position of X mark in FIG. 2. The case where no combustion was observed during the test was denoted as pass and the case where combustion was observed was denoted as fail. The case where no connector-like molded article could be obtained due to low fluidity of the material was denoted as untestable.

(7) Resistance to Soldering Heat

The melting point of a polyamide resin composition was measured by the method described in (1), and the meting point of 250° C. or higher was denoted as 0; and that of less than 250° C., as X.

Resins used in Examples and Comparative Examples are shown hereinafter.

[Polyamide (A)]
PA66: Polyamide 66
    Leona® "1300", made by Asahi Kasei Chemicals Corp., melting point: 265° C.
PA66/6: Polyamide 66/6
    Leona® "9200", made by Asahi Kasei Chemicals Corp., melting point: 245° C.
PA6: Polyamide 6
    UBE Nylon® 6 "1013B", made by UBE Industries, Ltd., melting point: 220° C.
PA66/6I: Polyamide 66/6I
    A polyamide manufactured in Manufacturing Example 1, melting point: 240° C.
[Melamine Cyanurate-Based Flame Retardant (B)]
MC-1: Melamine Cyanurate
    MC50, made by Ciba Speciality Chemicals Corp., median particle diameter (D50): 4 μm MC-2: Melamine Cyanurate
    MCA-C0, made by Mitsubishi Chemical Corp., median particle diameter (D50): 190 μm
[Surfactant (C)]
PEM: Polyoxyethylene Monolaurate
    EMANON® 1112, made by Kao Corp.
PEG: Polyethylene Glycol
    PEG400, made by Sanyo Chemical Industries, Ltd.
EBS: Ethylene Bisstearylamide
    KAOWAX® EB-P, made by Kao Corp.

Manufacturing Example 1

Manufacturing Example of a Polyamide PA66/6I 1.2 Kg of an equimolar salt of adipic acid and hexamethylenediamine, 0.3 kg of an equimolar salt of isophthalic acid and hexamethylenediamine, 0.06 kg of adipic acid and 1.5 kg of pure water were charged in an autoclave of 5 L, followed by vigorous stirring. After 5 times replacement with nitrogen, the temperature was raised from room temperature to 220° C. over about 1 hour with stirring. In this case, the internal pressure of the autoclave reached 1.8 MPa in gauge pressure, and the heating was continued keeping 1.8 Mpa pressure while removing water out of the reaction system. Furthermore, when the internal temperature reached 260° C. after a lapse of 2 hours, the heating was stopped, and the valve of the autoclave was closed and the content was cooled to room temperature over about 8 hours. After the cooling, the autoclave was opened, and about 2 kg of a polymer was taken out and ground. The resulting ground polymer was charged in an evaporator of 10 L and subjected to solid phase polymerization at 200° C. for 10 hours in a nitrogen stream. The polyamide obtained by the solid phase polymerization contained 18.8 mol % of a hexamethylene isophthalamide unit.

Example 1

(A) PA66 and PA66/6 and (B) MC-1 were fed to a twin-screw extruder (TEM35 made by Toshiba Machine Co., Ltd., co-rotating twin-screw type, L/D=47.6 (D=37 mmφ)) through a first feed opening thereof using three different loss-in-weight feeders (LWF-D5, made by K-TRON International, Inc.); and (C) PEM was fed thereto using one liquid feed pump (3MC051, made by Fuji Pump Co., Ltd.). At this time, the amounts fed from the feeders and the pump were regulated so that the amounts of PA66, PA66/6 and MC-1 became 50% by mass, 25% by mass and 25% by mass, respectively, based on 100% by mass of the total of the polyamide resin (A) and the melamine cyanurate-based flame retardant (B); and the content of PEM became 0.20 part by mass based on 100 parts by mass of the total of PA66, PA66/6 and MC-1, and extrusion was carried out at a cylinder temperature of 270° C. and an extrusion rate of 20 kg/hr (a residence time of 3 min). A polymer was discharged in strand form from an extruder front end nozzle, cooled with water, and cut into pellets. The obtained pellets had no surface roughness observed and were in good condition. Results of evaluations of the obtained polyamide resin composition as a molding material are shown in Table 1.

Example 2

Pellets were obtained in the similar manner as in Example 1, except for that the amounts fed from the feeders and the pump were regulated so that the amounts of PA66, PA66/6 and MC-1 became 40% by mass, 20% by mass and 40% by mass, respectively, based on 100% by mass of the total of the polyamide resin (A) and the melamine cyanurate-based flame retardant (B). The obtained pellets had surface roughness observed. Results of evaluations of the obtained polyamide resin composition as a molding material are shown in Table 1.

Example 3

Pellets were obtained in the similar manner as in Example 1, except for that the amounts fed from the feeders and the pump were regulated so that the amounts of PA66, PA66/6 and MC-1 became 35% by mass, 40% by mass and 25% by mass, respectively, based on 100% by mass of the total of the polyamide resin (A) and the melamine cyanurate-based flame retardant (B). The obtained pellets had no surface roughness observed and were in good condition. Results of evaluations of the obtained polyamide resin composition as a molding material are shown in Table 1.

Example 4

Pellets were obtained in the similar manner as in Example 1, except for that the amounts fed from the feeders and the pump were regulated so that the amounts of PA66, PA66/6 and MC-1 became 30% by mass, 35% by mass and 35% by mass, respectively, based on 100% by mass of the total of the polyamide resin (A) and the melamine cyanurate-based flame retardant (B). The obtained pellets had surface roughness observed. Results of evaluations of the obtained polyamide resin composition as a molding material are shown in Table 1.

Example 5

Pellets were obtained in the similar manner as in Example 1, except for that the amounts fed from the feeders and the pump were regulated so that the amounts of PA66, PA66/6 and MC-1 became 25% by mass, 35% by mass and 40% by mass, respectively, based on 100% by mass of the total of the polyamide resin (A) and the melamine cyanurate-based flame retardant (B). The obtained pellets had surface roughness observed. Results of evaluations of the obtained polyamide resin composition as a molding material are shown in Table 1.

Comparative Example 1

Pellets were obtained in the similar manner as in Example 1, except for that the amounts fed from the feeders and the pump were regulated so that the amounts of PA66, PA66/6 and MC-1 became 55% by mass, 25% by mass and 20% by mass, respectively, based on 100% by mass of the total of the polyamide resin (A) and the melamine cyanurate-based flame retardant (B). The obtained pellets had no surface roughness observed and were in good condition. Results of evaluations of the obtained polyamide resin composition as a molding material are shown in Table 1. The obtained polyamide resin composition had low flame retardancy, did not satisfy a glow wire ignition temperature of 800° C., and failed the glow wire flammability test, thus being unable to achieve the purpose of the embodiment.

Comparative Example 2

Pellets were obtained in the similar manner as in Example 1, except for that the amounts fed from the feeders and the pump were regulated so that the amounts of PA66, PA66/6 and MC-1 became 35% by mass, 45% by mass and 20% by mass, respectively, based on 100% by mass of the total of the polyamide resin (A) and the melamine cyanurate-based flame retardant (B). The obtained pellets had no surface roughness observed and were in good condition. Results of evaluations of the obtained polyamide resin composition as a molding material are shown in Table 1. The obtained polyamide resin composition had low flame retardancy, did not satisfy a glow wire ignition temperature of 800° C., and failed the glow wire flammability test, thus being unable to achieve the purpose of the embodiment.

Comparative Example 3

Pellets were obtained in the similar manner as in Example 1, except for that the amounts fed from the feeders and the pump were regulated so that the amounts of PA66, PA66/6 and MC-1 became 20% by mass, 35% by mass and 45% by mass, respectively, based on 100% by mass of the total of the polyamide resin (A) and the melamine cyanurate-based flame retardant (B). Results of evaluations of the obtained polyamide resin composition as a molding material are shown in Table 1. The obtained polyamide resin composition had low flame retardancy and failed the glow wire flammability test. Further, the melting point of the polyamide resin composition was lower than 250° C. and the resistance to soldering heat was inferior. The obtained polyamide resin composition could not achieve the purpose of the embodiment.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Polyamide Resin (A) | Kind | PA66 | PA66 | PA66 | PA66 | PA66 | PA66 | PA66 | PA66 |
| | Proportion | 50 | 40 | 35 | 30 | 25 | 55 | 35 | 20 |
| | Kind | PA66/6 | PA66/6 | PA66/6 | PA66/6 | PA66/6 | PA66/6 | PA66/6 | PA66/6 |
| | Proportion | 25 | 20 | 40 | 35 | 35 | 25 | 45 | 35 |
| Melamine Cyanurate-based Flame Retardant (B) | Kind | MC-1 | MC-1 | MC-1 | MC-1 | MC-1 | MC-1 | MC-1 | MC-1 |
| | Proportion | 25 | 40 | 25 | 35 | 40 | 20 | 20 | 45 |
| Surfactant (C) | Kind | PEM | PEM | PEM | PEM | PEM | PEM | PEM | PEM |
| | Proportion | 0.20 | 0.20 | 0.20 | 0.20 | 0.20 | 0.20 | 0.20 | 0.20 |
| Average Dispersion Particle Diameter ($\mu$m) | | 12.2 | 14.4 | 11.8 | 12.9 | 14 | 10.2 | 9.6 | 19.6 |
| Tensile Elongation (%) | | 3.2 | 2 | 3.3 | 2.3 | 2.1 | 4.2 | 4.1 | 1.8 |
| Glow Wire Ignition Temperature | | 800° C. | 800° C. | 800° C. | 800° C. | 800° C. | 750° C. | 775° C. | 800° C. |

TABLE 1-continued

| | Example 1 | Example 2 | Example 3 | Example 4 | Example 5 | Comparative Example 1 | Comparative Example 2 | Comparative Example 3 |
|---|---|---|---|---|---|---|---|---|
| Glow Wire Flammability Test | Pass | Pass | Pass | Pass | Pass | Fail | Fail | Fail |
| resistance to soldering heat | ○ | ○ | ○ | ○ | ○ | ○ | ○ | X |

Example 6

5 kg of PA66 and 2.5 kg of PA66/6 as (A) were fed into a cone blender (SKD25S, made by Platec Co., Ltd.), and thereafter, 0.02 kg of (C) PEM (melting point: 10 to 13° C.), which is a liquid at 23° C., was added thereto and mixed to spread the PEM on the polyamide pellet surface. 1 kg of (B) MC-1 was further added thereto and mixed to obtain a blend in which powdery MC-1 was spread on the polyamide pellet surface. The blend and 1.5 kg of MC-1 were fed to a twin-screw extruder (TEM35, made by Toshiba Machine Co., Ltd., co-rotating twin-screw rotation type, L/D=47.6 (D=37 mmφ)) through a first feed opening thereof using two different loss-in-weight feeders (LWF-D5, made by K-TRON International, Inc.). At this time, the amounts fed from the feeders were regulated so that the amounts of PA66, PA66/6 and MC-1 became 50% by mass, 25% by mass and 25% by mass, respectively, based on 100% by mass of the total of the polyamide resin (A) and the melamine cyanurate-based flame retardant (B); and the content of PEM became 0.20 part by mass based on 100 parts by mass of the total of PA66, PA66/6 and MC-1, and extrusion was carried out at a cylinder temperature of 270° C. and an extrusion rate of 30 kg/hr (a residence time of 2 min). A polymer was discharged in strand form from an extruder front end nozzle, cooled with water, and cut into pellets. The obtained pellets had no surface roughness observed and were in good condition. Results of evaluations of the obtained polyamide resin composition as a molding material are shown in Table 2.

Example 7

4 kg of PA66 and 2 kg of PA66/6 as (A) were fed into the cone blender, and thereafter, 0.02 kg of (C) PEM (melting point: 10 to 13° C.), which is a liquid at 23° C., was added thereto and mixed to spread the PEM on the polyamide pellet surface. 1.5 kg of (B) MC-1 was further added thereto and mixed to obtain a blend in which powdery MC-1 was spread on the polyamide pellet surface. Pellets were fabricated in the similar manner as in Example 6, except for that the blend and 2.5 kg of MC-1 were fed using two different loss-in-weight feeders and the amounts fed from the feeders were regulated so that the amounts of PA66, PA66/6 and MC-1 became 40% by mass, 20% by mass and 40% by mass, respectively, based on 100% by mass of the total of the polyamide resin (A) and the melamine cyanurate-based flame retardant (B). The obtained pellets had no surface roughness observed and were in good condition. Results of evaluations of the obtained polyamide resin composition as a molding material are shown in Table 2.

Example 8

3.5 kg of PA66 and 4 kg of PA66/6 as (A) were fed into the cone blender, and thereafter, 0.02 kg of (C) PEM (melting point: 10 to 13° C.), which is a liquid at 23° C., was added thereto and mixed to spread the PEM on the polyamide pellet surface. 1 kg of (B) MC-1 was further added thereto and mixed to obtain a blend in which powdery MC-1 was spread on the polyamide pellet surface. Pellets were fabricated in the similar manner as in Example 6, except for that the blend and 1.5 kg of MC-1 were fed using two different loss-in-weight feeders and the amounts fed from the feeders were regulated so that the amounts of PA66, PA66/6 and MC-1 became 35% by mass, 40% by mass and 25% by mass, respectively, based on 100% by mass of the total of the polyamide resin (A) and the melamine cyanurate-based flame retardant (B). The obtained pellets had no surface roughness observed and were in good condition. Results of evaluations of the obtained polyamide resin composition as a molding material are shown in Table 2.

Example 9

2.5 kg of PA66 and 3.5 kg of PA66/6 as (A) were fed into the cone blender, and thereafter, 0.02 kg of (C) PEM (melting point: 10 to 13° C.), which is a liquid at 23° C., was added thereto and mixed to spread the PEM on the polyamide pellet surface. 1.5 kg of (B) MC-1 was further added thereto and mixed to obtain a blend in which powdery MC-1 was spread on the polyamide pellet surface. Pellets were fabricated in the similar manner as in Example 6, except for that the blend and 2.5 kg of MC-1 were fed using two different loss-in-weight feeders and the amounts fed from the feeders were regulated so that the amounts of PA66, PA66/6 and MC-1 became 25% by mass, 35% by mass and 40% by mass, respectively, based on 100% by mass of the total of the polyamide resin (A) and the melamine cyanurate-based flame retardant (B). The obtained pellets had no surface roughness observed and were in good condition. Results of evaluations of the obtained polyamide resin composition as a molding material are shown in Table 2.

Example 10

3 kg of PA66 and 3.5 kg of PA66/6 as (A) were fed into the cone blender, and thereafter, 0.02 kg of (C) PEM (melting point: 10 to 13° C.), which is a liquid at 23° C., was added thereto and mixed to spread the PEM on the polyamide pellet surface. 1 kg of (B) MC-1 was further added thereto and mixed to obtain a blend in which powdery MC-1 was spread on the polyamide pellet surface. Pellets were fabricated in the similar manner as in Example 6, except for that the blend and 2.5 kg of MC-1 were fed using two different loss-in-weight feeders and the amounts fed from the feeders were regulated so that the amounts of PA66, PA66/6 and MC-1 became 30% by mass, 35% by mass and 35% by mass, respectively, based on 100% by mass of the total of the polyamide resin (A) and the melamine cyanurate-based flame retardant (B). The obtained pellets had no surface roughness observed and were in good condition. Results of evaluations of the obtained polyamide resin composition as a molding material are shown in Table 2.

Example 11

4 kg of PA66 and 2.5 kg of PA66/6 as (A) were fed into the cone blender, and thereafter, 0.02 kg of (C) PEM (melting point: 10 to 13° C.), which is a liquid at 23° C., was added thereto and mixed to spread the PEM on the polyamide pellet surface. 1 kg of (B) MC-1 was further added thereto and mixed to obtain a blend in which powdery MC-1 was spread on the polyamide pellet surface. Pellets were fabricated in the similar manner as in Example 6, except for that the blend and 2.5 kg of MC-1 were fed using two different loss-in-weight feeders and the amounts fed from the feeders were regulated so that the amounts of PA66, PA66/6 and MC-1 became 40% by mass, 25% by mass and 35% by mass, respectively, based on 100% by mass of the total of the polyamide resin (A) and the melamine cyanurate-based flame retardant (B). The obtained pellets had no surface roughness observed and were in good condition. Results of evaluations of the obtained polyamide resin composition as a molding material are shown in Table 2.

Comparative Example 4

5.5 kg of PA66 and 2.5 kg of PA66/6 as (A) were fed into the cone blender, and thereafter, 0.02 kg of (C) PEM (melting point: 10 to 13° C.), which is a liquid at 23° C., was added thereto and mixed to spread the PEM on the polyamide pellet surface. 1 kg of (B) MC-1 was further added thereto and mixed to obtain a blend in which powdery MC-1 was spread on the polyamide pellet surface. Pellets were fabricated in the similar manner as in Example 6, except for that the blend and 1 kg of MC-1 were fed using two different loss-in-weight feeders and the amounts fed from the feeders were regulated so that the amounts of PA66, PA66/6 and MC-1 became 55% by mass, 25% by mass and 20% by mass, respectively, based on 100% by mass of the total of the polyamide resin (A) and the melamine cyanurate-based flame retardant (B). The obtained pellets had no surface roughness observed and were in good condition. Results of evaluations of the obtained polyamide resin composition as a molding material are shown in Table 2. The obtained polyamide resin composition had low flame retardancy, did not satisfy a glow wire ignition temperature of 800° C., and failed the glow wire flammability test, thus being unable to achieve the purpose of the embodiment.

Comparative Example 5

3.5 kg of PA66 and 4.5 kg of PA66/6 as (A) were fed into the cone blender, and thereafter, 0.02 kg of (C) PEM (melting point: 10 to 13° C.), which is a liquid at 23° C., was added thereto and mixed to spread the PEM on the polyamide pellet surface. 1 kg of (B) MC-1 was further added thereto and mixed to obtain a blend in which powdery MC-1 was spread on the polyamide pellet surface. Pellets were fabricated in the similar manner as in Example 6, except for that the blend and 1 kg of MC-1 were fed using two different loss-in-weight feeders and the amounts fed from the feeders were regulated so that the amounts of PA66, PA66/6 and MC-1 became 35% by mass, 45% by mass and 20% by mass, respectively, based on 100% by mass of the total of the polyamide resin (A) and the melamine cyanurate-based flame retardant (B). The obtained pellets had no surface roughness observed and were in good condition. Results of evaluations of the obtained polyamide resin composition as a molding material are shown in Table 2. The obtained polyamide resin composition had low flame retardancy, did not satisfy a glow wire ignition temperature of 800° C., and failed the glow wire flammability test, thus being unable to achieve the purpose of the embodiment.

Comparative Example 6

2.0 kg of PA66 and 3.5 kg of PA66/6 as (A) were fed into the cone blender, and thereafter, 0.02 kg of (C) PEM (melting point: 10 to 13° C.), which is a liquid at 23° C., was added thereto and mixed to spread the PEM on the polyamide pellet surface. 3 kg of (B) MC-1 was further added thereto and mixed to obtain a blend in which powdery MC-1 was spread on the polyamide pellet surface. Pellets were fabricated in the similar manner as in Example 6, except for that the blend and 2.5 kg of MC-1 were fed using two different loss-in-weight feeders and the amounts fed from the feeders were regulated so that the amounts of PA66, PA66/6 and MC-1 became 20% by mass, 35% by mass and 45% by mass, respectively, based on 100% by mass of the total of the polyamide resin (A) and the melamine cyanurate-based flame retardant (B). The obtained pellets had surface roughness observed. Results of evaluations of the obtained polyamide resin composition as a molding material are shown in Table 2. The obtained polyamide resin composition had low flame retardancy and failed the glow wire flammability test. Further, the melting point of the polyamide resin composition was lower than 250° C. and the resistance to soldering heat was insufficient. The obtained polyamide resin composition could not achieve the purpose of the embodiment.

TABLE 2

|  |  | Example 6 | Example 7 | Example 8 | Example 9 | Example 10 | Example 11 | Comparative Example 4 | Comparative Example 5 | Comparative Example 6 |
|---|---|---|---|---|---|---|---|---|---|---|
| Polyamide Resin (A) | Kind | PA66 | PA66 | PA66 | PA66 | PA66 | PA66 | PA66 | PA66 | PA66 |
|  | Proportion | 50 | 40 | 35 | 25 | 30 | 40 | 55 | 35 | 20 |
|  | Kind | PA66/6 | PA66/6 | PA66/6 | PA66/6 | PA66/6 | PA66/6 | PA66/6 | PA66/6 | PA66/6 |
|  | Proportion | 25 | 20 | 40 | 35 | 35 | 25 | 25 | 45 | 35 |
| Melamine Cyanurate-based Flame Retardant (B) | Kind | MC-1 | MC-1 | MC-1 | MC-1 | MC-1 | MC-1 | MC-1 | MC-1 | MC-1 |
|  | Proportion | 25 | 40 | 25 | 40 | 35 | 35 | 20 | 20 | 45 |
| Surfactant (C) | Kind | PEM | PEM | PEM | PEM | PEM | PEM | PEM | PEM | PEM |
|  | Proportion | 0.20 | 0.20 | 0.20 | 0.20 | 0.20 | 0.20 | 0.20 | 0.20 | 0.20 |
| Average Dispersion Particle Diameter (μm) |  | 11.3 | 13.8 | 10.8 | 13.2 | 12 | 12.6 | 10.5 | 9 | 19.4 |
| Tensile Elongation (%) |  | 3.4 | 2.2 | 3.6 | 2.4 | 2.6 | 2.5 | 4.1 | 4.3 | 2.1 |
| Glow Wire Ignition Temperature |  | 825° C. | 825° C. | 825° C. | 825° C. | 825° C. | 825° C. | 775° C. | 775° C. | 800° C. |
| Glow Wire Flammability Test |  | Pass | Pass | Pass | Pass | Pass | Pass | Fail | Fail | Fail |
| resistance to soldering heat |  | ◯ | ◯ | ◯ | ◯ | ◯ | ◯ | ◯ | ◯ | X |

Example 12

Pellets were fabricated in the similar manner as in Example 10, except for using PA6 in place of PA66/6 as (A). The pellets had no surface roughness observed and were in good condition. Results of evaluations of the obtained polyamide resin composition as a molding material are shown in Table 3.

Example 13

Pellets were fabricated in the similar manner as in Example 10, except for using PA66/6I in place of PA66/6 as (A). The obtained pellets had no surface roughness observed and were in good condition. Results of evaluations of the obtained polyamide resin composition as a molding material are shown in Table 3.

Example 14

6.5 kg of (A) PA66 was fed into a cone blender, and thereafter, 0.02 kg of (C) PEM (melting point: 10 to 13° C.), which is a liquid at 23° C., was added thereto and mixed to spread the PEM on the polyamide pellet surface. 1 kg of (B) MC-1 was further added thereto and mixed to obtain a blend in which powdery MC-1 was spread on the polyamide pellet surface. The blend and 2.5 kg of MC-1 were fed to a twin-screw extruder (TEM35, made by Toshiba Machine Co., Ltd., co-rotating twin-screw rotation type, L/D=47.6 (D=37 mmφ)) through a first feed opening thereof using two different loss-in-weight feeders (LWF-D5, made by K-TRON International, Inc.). At this time, while feeding was carried out so that the amounts of PA66 and MC-1 became 65% by mass and 35% by mass, respectively, based on 100% by mass of the total of the polyamide resin (A) and the melamine cyanurate-based flame retardant (B); and the content of PEM became 0.20 part by mass based on 100 parts by mass of the total of PA66 and MC-1, extrusion was carried out at a cylinder temperature of 270° C. and an extrusion rate of 30 kg/hr (a residence time of 2 min). A polymer was discharged in strand form from an extruder front end nozzle, cooled with water, and cut into pellets. The obtained pellets had surface roughness observed. Results of evaluations of the obtained polyamide resin composition as a molding material are shown in Table 3.

Comparative Example 7

Pellets were fabricated in the similar manner as in Example 14, except for using PA66/6 in place of PA66 as (A). The obtained pellets had no surface roughness observed and were in good condition. Results of evaluations of the obtained polyamide resin composition as a molding material are shown in Table 3. The melting point of the obtained polyamide resin composition was 250° C. or lower and the resistance to soldering heat was insufficient. The obtained polyamide resin composition could not achieve the purpose of the embodiment.

Comparative Example 8

Pellets were fabricated in the similar manner as in Example 10, except for not adding (c) PEM. The obtained pellets had surface roughness observed. Results of evaluations of the obtained polyamide resin composition as a molding material are shown in Table 3. The obtained polyamide resin composition had low flame retardancy, did not satisfy a glow wire ignition temperature of 800° C., and failed the glow wire flammability test, thus being unable to achieve the purpose of the embodiment.

Comparative Example 9

3 kg of PA66 and 3.5 kg of PA66/6 as (A), respectively, were fed into the cone blender, and thereafter, 0.02 kg of (C) PEM (melting point: 10 to 13° C.), which is a liquid at 23° C., was added thereto and mixed to spread the PEM on the polyamide pellet surface. 1 kg of (B) MC-1 was further added thereto and mixed to obtain a blend in which powdery MC-1 was spread on the polyamide pellet surface. Pellets were fabricated in the similar manner as in Example 10, except for that the blend and 2.5 kg of MC-1 were fed using two different loss-in-weight feeders and the amounts fed from the feeders were regulated so that the content of PEM became 1.5 parts by mass. The obtained pellets had no surface roughness observed and were in good condition. Results of evaluations of the obtained polyamide resin composition as a molding material are shown in Table 3. The obtained polyamide resin composition had low flame retardancy and failed the glow wire flammability test, thus being unable to achieve the purpose of the embodiment.

Comparative Example 10

Pellets were fabricated in the similar manner as in Example 10, except for using PEG in place of (C) PEM. The obtained pellets had surface roughness observed. Results of evaluations of the obtained polyamide resin composition as a molding material are shown in Table 3. The obtained polyamide resin composition had low flame retardancy, did not satisfy a glow wire ignition temperature of 800° C., and failed the glow wire flammability test, thus being unable to achieve the purpose of the embodiment.

Comparative Example 11

Pellets were fabricated in the similar manner as in Example 10, except for using EBS in place of (C) PEM. The obtained pellets had surface roughness observed. Results of evaluations of the obtained polyamide resin composition as a molding material are shown in Table 3. The obtained polyamide resin composition had low flame retardancy and failed the glow wire flammability test, thus being unable to achieve the purpose of the embodiment.

Comparative Example 12

Pellets were fabricated in the similar manner as in Example 10, except for using MC-2 in place of (B) MC-1. The obtained pellets had surface roughness observed. Results of evaluations of the obtained polyamide resin composition as a molding material are shown in Table 3. The obtained polyamide resin composition had low flame retardancy, did not satisfy a glow wire ignition temperature of 800° C., and failed the glow wire flammability test, thus being unable to achieve the purpose of the embodiment.

TABLE 3

|  |  | Example 12 | Example 13 | Example 14 | Comparative Example 7 | Comparative Example 8 | Comparative Example 9 | Comparative Example 10 | Comparative Example 11 | Comparative Example 12 |
|---|---|---|---|---|---|---|---|---|---|---|
| Polyamide Resin (A) | Kind | PA66 | PA66 | PA66 |  | PA66 | PA66 | PA66 | PA66 | PA66 |
|  | Proportion | 50 | 50 | 65 |  | 30 | 30 | 30 | 30 | 30 |
|  | Kind | PA6 | PA66/6I |  | PA66/6 | PA66/6 | PA66/6 | PA66/6 | PA66/6 | PA66/6 |
|  | Proportion | 25 | 25 |  | 65 | 35 | 35 | 35 | 35 | 35 |
| Melamine Cyanurate-based Flame Retardant (B) | Kind | MC-1 | MC-1 | MC-1 | MC-1 | MC-1 | MC-1 | MC-1 | MC-1 | MC-2 |
|  | Proportion | 25 | 25 | 35 | 35 | 35 | 35 | 35 | 35 | 35 |
| Surfactant (C) | Kind | PEM | PEM | PEM | PEM | None | PEM | PEG | EBS | PEM |
|  | Proportion | 0.20 | 0.20 | 0.20 | 0.20 |  | 1.50 | 0.20 | 0.20 | 0.20 |
| Average Dispersion Particle Diameter (μm) |  | 11.4 | 11.6 | 12.4 | 10.2 | 24.5 | 10.8 | 21.5 | 12.7 | 46.2 |
| Tensile Elongation (%) |  | 3.3 | 3.1 | 2.6 | 3.3 | 1.7 | 3.2 | 1.8 | 2.4 | 1.4 |
| Glow Wire Ignition Temperature |  | 825° C. | 825° C. | 800° C. | 800° C. | 775° C. | 800° C. | 775° C. | 800° C. | 750° C. |
| Glow Wire Flammability Test |  | Pass | Pass | Pass | Pass | Fail | Fail | Fail | Fail | Fail |
| resistance to soldering heat |  | ○ | ○ | ○ | ○ | ○ | ○ | ○ | ○ | ○ |

From the results of Table 1 to Table 3, any of the polyamide resin compositions of Examples 1 to 14 had excellent flame retardancy.

By contrast, in Comparative Examples 1, 2, 4 and 5 in which the content of the melamine cyanurate-based flame retardant (B) was less than 25% by mass, the glow wire ignition temperature of 800° C. was not satisfied, the glow wire flammability test was failed, and these Comparative Examples thus had low flame retardancy.

In Comparative Examples 3 and 6 in which the content of the melamine cyanurate-based flame retardant (B) was more than 40% by mass, the resistance to soldering heat was inferior, the glow wire flammability test was failed, and these Comparative Examples thus had low flame retardancy.

In Comparative Example 7 in which the polyamide resin (A1) was not contained, the resistance to soldering heat was inferior and this Comparative Example thus had low flame retardancy.

Further, in Comparative Examples 8, 10 and 11 in which the fatty acid ester of a polyalkylene polyhydric alcohol as the surfactant (C) was not contained, the glow wire flammability test was failed and these Comparative Examples thus had low flame retardancy.

Still further, in Comparative Example 9 in which more than 1.0 part by mass of the surfactant (C) was contained, the glow wire flammability test was failed and this Comparative Example thus had low flame retardancy.

In Comparative Example 12 in which the melamine cyanurate-based flame retardant (B) had an average dispersion particle diameter more than 20 km, the glow wire ignition temperature of 800° C. was not satisfied, the glow wire flammability test was failed and this Comparative Example thus had low flame retardancy.

The present application is based on Japanese Patent Application No. 2007-149532, filed on Jun. 5, 2007, the disclosure of which is incorporated herein by reference in its entirety.

INDUSTRIAL APPLICABILITY

Since the polyamide resin composition according to the present invention has high flame retardancy, it is useful as an industrial material for various mechanical industrial parts and electric parts and electronic parts, particularly connectors.

The invention claimed is:

1. A polyamide resin composition comprising a polyamide resin (A), a melamine cyanurate-based flame retardant (B) and a surfactant (C),
   wherein the polyamide resin composition comprises 100 parts by mass of the total of 60 to 75% by mass of the polyamide resin (A) comprising at least one or more polyamide resin (A1) having a melting point of 255 to 270° C. and 25 to 40% by mass of the melamine cyanurate-based flame retardant (B), and 0.1 to 1.0 part by mass of the surfactant (C) comprising at least one or more fatty acid ester of a polyalkylene polyhydric alcohol, and
   wherein the melamine cyanurate-based flame retardant (B) dispersed in the polyamide resin composition has an average dispersion particle diameter of 1 to 20 μm.

2. The polyamide resin composition according to claim 1, wherein the polyamide resin (A) further comprises a polyamide resin (A2) having a melting point of 180 to 250° C.

3. The polyamide resin composition according to claim 2, wherein the polyamide resin (A) comprises 40 to 80% by mass of the polyamide resin (A1) and 20 to 60% by mass of the polyamide resin (A2).

4. The polyamide resin composition according to claim 1, wherein the polyamide resin (A1) is a polyamide 66.

5. The polyamide resin composition according to claim 2, wherein the polyamide resin (A2) is one or more polyamides selected from polyamides 6 and polyamide copolymers comprising one or more monomer units of polyamide 6, polyamide 610, polyamide 612 or polyamide 6I and a monomer unit of polyamide 66.

6. The polyamide resin composition according to claim 1, wherein the melamine cyanurate-based flame retardant (B) has an average dispersion particle diameter of 5 to 15 μm.

7. The polyamide resin composition according to claim 1, wherein the melamine cyanurate-based flame retardant (B) is melamine cyanurate.

8. The polyamide resin composition according to claim 1, wherein the surfactant (C) is at least one selected from the group consisting of polyoxyethylene monolaurate, polyoxyethylene monostearate, polyoxyethylene distearate, polyoxyethylene monooleate, polyoxyethylene sorbitan monolaurate, polyoxyethylene sorbitan monostearate, polyoxyethylene sorbitan tristearate, polyoxyethylene sorbitan monooleate, and polyoxyethylene sorbitan trioleate.

9. A method for manufacturing a polyamide resin composition comprising a polyamide resin (A), a melamine cyanurate-based flame retardant (B) and a surfactant (C), comprising the step of feeding all components into a twin-screw extruder through a first feed opening thereof using at least one raw material feed apparatus to melt-knead the components, wherein the polyamide resin composition comprises 100 parts by mass of the total of 60 to 75% by mass of the polyamide resin (A) comprising at least one or more polyamide resin (A1) having a melting point of 255 to 270° C. and 25 to 40% by mass of the melamine cyanurate-based flame retardant (B), and 0.1 to 1.0 part by mass of the surfactant (C) comprising at least one fatty acid ester of a polyalkylene polyhydric alcohol, and wherein the melamine cyanurate-based flame retardant (B) dispersed in the polyamide resin composition has an average dispersion particle diameter of 1 to 20 μm.

10. The method for manufacturing a polyamide resin composition according to claim 9, wherein the feeding comprises feeding a blend comprising the total amount of the polyamide resin (A), the total amount of the surfactant (C) and 10 to 50% by mass of the melamine cyanurate-based flame retardant (B) into a twin-screw extruder through a first feed opening thereof using at least one raw material feed apparatus, and feeding 50 to 90% by mass of the melamine cyanurate-based flame retardant (B) into the twin-screw extruder through the first feed opening thereof using at least one raw material feed apparatus different from the former raw material feed apparatus.

11. The method for manufacturing a polyamide resin composition according to claim 9, wherein the melamine cyanurate-based flame retardant (B) has a median particle diameter of 1 to 25 μm.

12. The method for manufacturing a polyamide resin composition according to claim 9, wherein the polyamide resin (A) comprises 40 to 70% by mass of a polyamide resin (A1) having a melting point of 255 to 270° C. and 30 to 60% by mass of a polyamide resin (A2) having a melting point of 180 to 250° C.

13. The method for manufacturing a polyamide resin composition according to claim 12, wherein the polyamide resin (A1) is a polyamide 66; and the polyamide resin (A2) is one or more polyamides selected from polyamides 6 and polyamide copolymers comprising one or more monomer units of polyamide 6, polyamide 610, polyamide 612 or polyamide 6I and a monomer unit of polyamide 66.

14. The method for manufacturing a polyamide resin composition according to claim 9, wherein the melamine cyanurate-based flame retardant (B) is melamine cyanurate.

15. The method for manufacturing a polyamide resin composition according to claim 9, wherein the surfactant (C) is at least one selected from the group consisting of polyoxyethylene monolaurate, polyoxyethylene monostearate, polyoxyethylene distearate, polyoxyethylene monooleate, polyoxyethylene sorbitan monolaurate, polyoxyethylene sorbitan monostearate, polyoxyethylene sorbitan tristearate, polyoxyethylene sorbitan monooleate, and polyoxyethylene sorbitan trioleate.

16. The polyamide resin composition according to claim 5, wherein the polyamide resin (A1) is a polyamide 66.

\* \* \* \* \*